United States Patent
Li et al.

(10) Patent No.: US 11,935,538 B2
(45) Date of Patent: Mar. 19, 2024

(54) HEADSET BOOM WITH INFRARED LAMP(S) AND/OR SENSOR(S)

(71) Applicant: Lenovo (Singapore) Pte. Ltd., Singapore (SG)

(72) Inventors: Scott Wentao Li, Cary, NC (US); Robert J. Kapinos, Durham, NC (US); Russell Speight VanBlon, Raleigh, NC (US); Robert Norton, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 555 days.

(21) Appl. No.: 16/993,794

(22) Filed: Aug. 14, 2020

(65) Prior Publication Data
US 2022/0051676 A1    Feb. 17, 2022

(51) Int. Cl.
*G10L 15/00*  (2013.01)
*G10L 15/25*  (2013.01)
(Continued)

(52) U.S. Cl.
CPC .......... *G10L 15/25* (2013.01); *H04R 1/08* (2013.01); *H04R 1/1008* (2013.01)

(58) Field of Classification Search
CPC ......... G10L 15/25; G10L 15/32; G10L 15/20; G10L 25/18; G10L 25/78; G10L 15/07;
(Continued)

(56) References Cited

U.S. PATENT DOCUMENTS 6,259,475 B1 * 7/2001 Ramachandran .... B60Q 1/0023
                                                       348/148
6,347,300 B1 * 2/2002 Minematsu ............. G10L 15/07
                                                       704/271
(Continued)

FOREIGN PATENT DOCUMENTS

WO    WO-2020073403 A1 *  4/2020  ......... G06K 9/00288
WO    WO-2021231295 A1 * 11/2021

OTHER PUBLICATIONS

"Feature Extraction", Wikipedia, retrieved on Jul. 16, 2020 from https://en.wikipedia.org/wiki/Feature_extraction.
(Continued)

*Primary Examiner* — Md S Elahee
(74) *Attorney, Agent, or Firm* — John M. Rogitz; John L. Rogitz (57) ABSTRACT

In one aspect, a headset assembly may include a headset housing, at least one processor, and a microphone boom coupled to the headset housing. The microphone boom may include an infrared (IR) sensor on a distal end segment, where the IR sensor may be accessible to the at least one processor. The microphone boom may further include at least one microphone accessible to the at least one processor. Additionally, the headset assembly may include storage accessible to the at least one processor. The storage may include instructions executable by the at least one processor to receive input from the IR sensor and, based on the input from the IR sensor, perform mouth feature extraction. The instructions may also be executable to execute at least one function based on the mouth feature extraction.

20 Claims, 6 Drawing Sheets

(51) Int. Cl.
   *H04R 1/08* (2006.01)
   *H04R 1/10* (2006.01)
(58) Field of Classification Search
   CPC ......... G10L 15/26; G10L 17/22; G10L 15/01;
              H04R 1/1008; H04R 1/08; H04R 1/1041;
              H04R 2201/107; H04R 29/008; H04L
              47/10; A61L 2/0088; G06F 21/32
   USPC ........................................................ 704/231
   See application file for complete search history.

(56) References Cited

U.S. PATENT DOCUMENTS

| | | |
|---|---|---|
| 8,639,214 B1 | 1/2014 | Fujisaki |
| 9,071,692 B2 | 6/2015 | Sanaullah et al. |
| 9,940,944 B2 | 4/2018 | Finlow-Bates et al. |
| 9,967,520 B1 | 5/2018 | Rensburg et al. |
| 10,347,255 B1* | 7/2019 | Paul .......................... G10L 15/26 |
| 10,652,679 B1 | 5/2020 | Boss et al. |
| 2005/0033571 A1* | 2/2005 | Huang .................... G10L 15/20 |
| | | 704/E15.041 |
| 2006/0069557 A1* | 3/2006 | Barker .................... G10L 15/01 |
| | | 704/E15.002 |
| 2010/0034366 A1 | 2/2010 | Basson et al. |
| 2010/0080382 A1 | 4/2010 | Dresher et al. |
| 2010/0322387 A1 | 12/2010 | Cutler |
| 2010/0324891 A1 | 12/2010 | Cutler |
| 2011/0141925 A1* | 6/2011 | Velenko .................. H04L 47/10 |
| | | 370/252 |
| 2012/0026279 A1 | 2/2012 | Kato |
| 2013/0227678 A1* | 8/2013 | Kang et al. ............. G06F 21/32 |
| | | 726/19 |
| 2013/0321156 A1 | 12/2013 | Liu |
| 2014/0229866 A1 | 8/2014 | Gottlieb |
| 2015/0002611 A1 | 1/2015 | Thapliyal et al. |
| 2015/0085064 A1 | 3/2015 | Sanaullah et al. |
| 2015/0156598 A1* | 6/2015 | Sun ........................ G10L 25/48 |
| | | 348/14.07 |
| 2017/0006395 A1 | 1/2017 | Loo et al. |
| 2017/0171286 A1 | 6/2017 | Coste et al. |
| 2018/0358034 A1 | 12/2018 | Chakra et al. |
| 2019/0013026 A1* | 1/2019 | Feng ....................... G10L 25/51 |
| 2019/0014410 A1 | 1/2019 | Krishnamoorthy et al. |
| 2019/0075382 A1 | 3/2019 | Schrader et al. |
| 2020/0110572 A1 | 4/2020 | Lenke et al. |
| 2020/0285443 A1 | 9/2020 | Yuan et al. |

OTHER PUBLICATIONS

Seethaler et al., "Systems and Methods to Determine Whether to Unmute Microphone Based on Camera Input", file history of related U.S. Appl. No. 16/727,836, filed Dec. 26, 2019.

* cited by examiner

HEADSET BOOM WITH INFRARED LAMP(S) AND/OR SENSOR(S)

FIELD

The present application relates to technically inventive, non-routine solutions that are necessarily rooted in computer technology and that produce concrete technical improvements.

BACKGROUND

As recognized herein, current facial feature extraction systems are insufficient since a user's facial features are typically extracted from live-streamed photos or video from a red green blue (RGB) camera on a laptop or smartphone that is located at too great a distance from the user to accurately perform mouth feature extraction in particular. Even if mouth feature extraction can be performed in some capacity using an RGB camera, the present application recognizes that this process is still computationally expensive as it involves computer vision processing of the entire scene shown in the live-streamed images. And even then, mouth feature extraction using an RGB camera might still be impossible or inaccurate due to user head movements. There are currently no adequate solutions to the foregoing computer-related, technological problem.

SUMMARY

Accordingly, in one aspect a headset assembly includes a headset housing, at least one processor, and a microphone boom coupled to the headset housing. The microphone boom includes an infrared (IR) sensor on a distal end segment, where the IR sensor is accessible to the at least one processor. The microphone boom further includes at least one microphone accessible to the at least one processor. The headset assembly also includes storage accessible to the at least one processor. The storage includes instructions executable by the at least one processor to receive input from the IR sensor and, based on the input from the IR sensor, perform mouth feature extraction. The instructions are also executable to execute at least one function based on the mouth feature extraction.

Thus, in some example implementations the headset assembly may include a headset and another device in communication with the headset, where the other device may include the storage. In these implementations, the other device may also include an interface for receiving the input from the IR sensor to, at the other device, perform the mouth feature extraction and the execution of the at least one function.

Also in some example implementations, the headset assembly may include a headset, where the headset may include the at least one processor and the storage. In these implementations, the headset may perform the mouth feature extraction based on the at least one processor executing at least part of the instructions at the headset.

In some examples, the headset assembly may further include an IR lamp on the distal end segment, and the instructions may be executable to actuate the IR lamp to produce IR light that is sensed by the IR sensor for the mouth feature extraction.

Also in some examples, the mouth feature extraction may include identifying one or more of a shape of a user's mouth and movement of the user's mouth.

Still further, in some example implementations the instructions may be executable to resolve an ambiguity in voice input received via the at least one microphone based on the mouth feature extraction. As another example, the instructions may be executable to mute input from the at least one microphone based on the mouth feature extraction indicating no mouth movement. As yet another example, the instructions may be executable to determine that a user's mouth is moving based on the mouth feature extraction but that the user is not speaking and to, based on the determination, filter out audio indicated in input from the at least one microphone from being provided to a second device different from the headset assembly.

Also in some examples, the instructions may be executable to turn on the IR sensor responsive to voice input detected via the at least one microphone.

Still further, in some examples the IR sensor may include an IR camera.

In another aspect, a method includes receiving input from an infrared (IR) sensor on a headset and, based on the input from the IR sensor, identifying one or more features of a user's mouth. The method also includes executing at least one function at a device based on the identifying.

Thus, in some example implementations the identifying of the one or more features of the user's mouth may be performed by the headset.

Also in some example implementations, the device may be different from the headset, and the identifying of the one or more features of the user's mouth and the execution of the at least one function may be performed by the device.

In some examples, the IR sensor may be juxtaposed on a distal end segment of a microphone boom of the headset.

Also in some examples, the one or more features of the user's mouth may be identified as part of mouth feature extraction.

In various example embodiments, the at least one function may include prompting the user to make a particular shape with a portion of the user's mouth and/or prompting the user to place the user's tongue at a particular location within the user's mouth.

In another aspect, a headset includes a headset housing, an infrared (IR) sensor coupled to the headset housing, an IR lamp coupled to the headset housing, and at least one microphone coupled to the headset housing.

In some examples, the IR sensor, the IR lamp, and the at least one microphone may be located on a microphone boom coupled to the headset housing.

Also in some examples, the headset may include a communication interface that transmits input from the IR sensor and input from the at least one microphone to a second device different from the headset.

The details of present principles, both as to their structure and operation, can best be understood in reference to the accompanying drawings, in which like reference numerals refer to like parts, and in which:

DETAILED DESCRIPTION

As recognized herein, mouth shape and movement of the user's upper and lower lips, tongue, and other portions of the mouth can be used to perform or enhance computer-related functions since mouth shape and shape dynamics can convey communication content and other useful or important information such as pronunciation/sound profiles (e.g., during language learning). By using IR sensors and IR lamps on a headset boom, computational requirements on the system may be decreased, the sensing may be unhindered by head movement, and real time detection of movements and three dimension shapes of the mouth region may be accurately made (and often with higher resolution no less).

Thus, the IR sensors and lamps/illuminators on the headset boom may be configured so as to be located in front of and aimed at a user's mouth region when the headset is worn. The IR sensors on the boom may even be directionally adjustable (e.g., via a hinge). Furthermore, in some examples a microphone may be located on the boom and the microphone and IR sensors may be linked so that, e.g., the IR sensor(s) may be turned on when the microphone detects sound.

These items may be used for a variety of functions. For example, during language learning like pronunciation training, detection of the user's mouth, lip, and/or tongue position can be used to provide feedback if user is making the correct mouth shape and tongue positions for a given word the user is learning to pronounce.

As another example, during a conference call the IR sensor(s) on the boom may be used to perform a dynamic, fast auto-mute if no movement is detected in the user's mouth region (thus preventing noise injection into the active conference call). Additionally or alternatively, input from the IR sensor(s) may be used for a dynamic noise filter that uses the user's mouth region, where the sensing axis or direction in which the sensor is facing may be orthogonal to the user's mouth.

Present principles may also be used to enhance voice dictation and/or voice input accuracy. For example, IR mapping of the user's mouth region may be used to enhance speech-to-text model accuracy.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
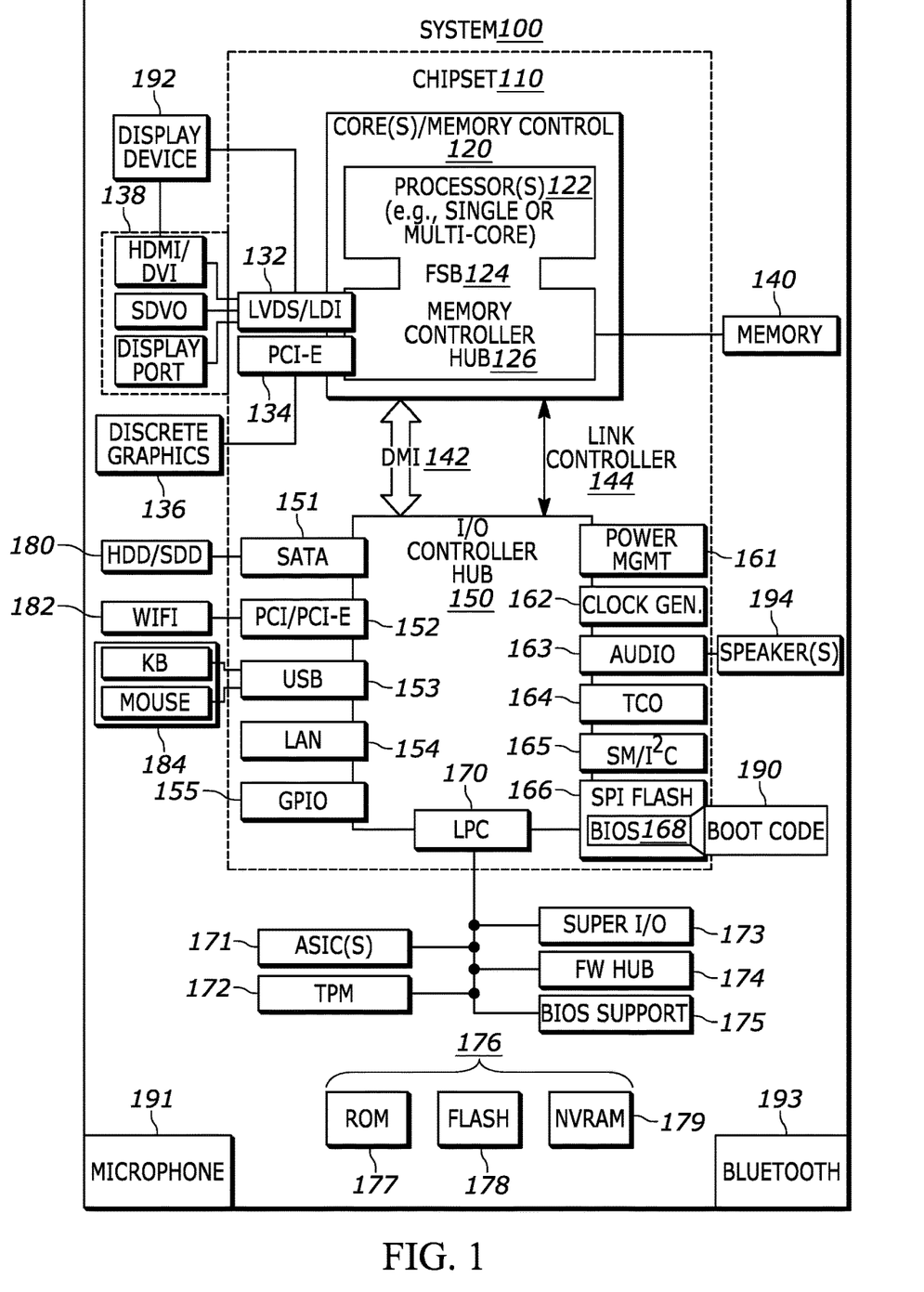
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include a Bluetooth transceiver and/or other short-range wireless communication interface 193 for use to communicate with a headset consistent with present principles. For example, one or more publicly-available Bluetooth specifications may be used for Bluetooth communication with the headset using the transceiver 193. Thus, the Bluetooth communication transceiver 193 may be a classic Bluetooth transceiver and/or a Bluetooth low energy (BLE) transceiver (e.g., Bluetooth 5.0 transceiver) for communicating with other devices using Bluetooth communication protocols. Additionally, as alluded to above the transceiver 193 may also be configured for communicating using other wireless protocols and may therefore establish a Zigbee transceiver, Z-wave transceiver, near field communication (NFC) transceiver, infrared transceiver, a Wi-Fi direct transceiver, and/or wireless universal serial bus (USB) transceiver.

As also shown in FIG. 1, the system 100 may include an audio receiver/microphone 191 that provides input from the microphone 191 to the processor 122 based on audio that is detected, such as via a user providing audible input to the microphone consistent with present principles.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. The system 100 may also include a camera that gathers one or more images and provides images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
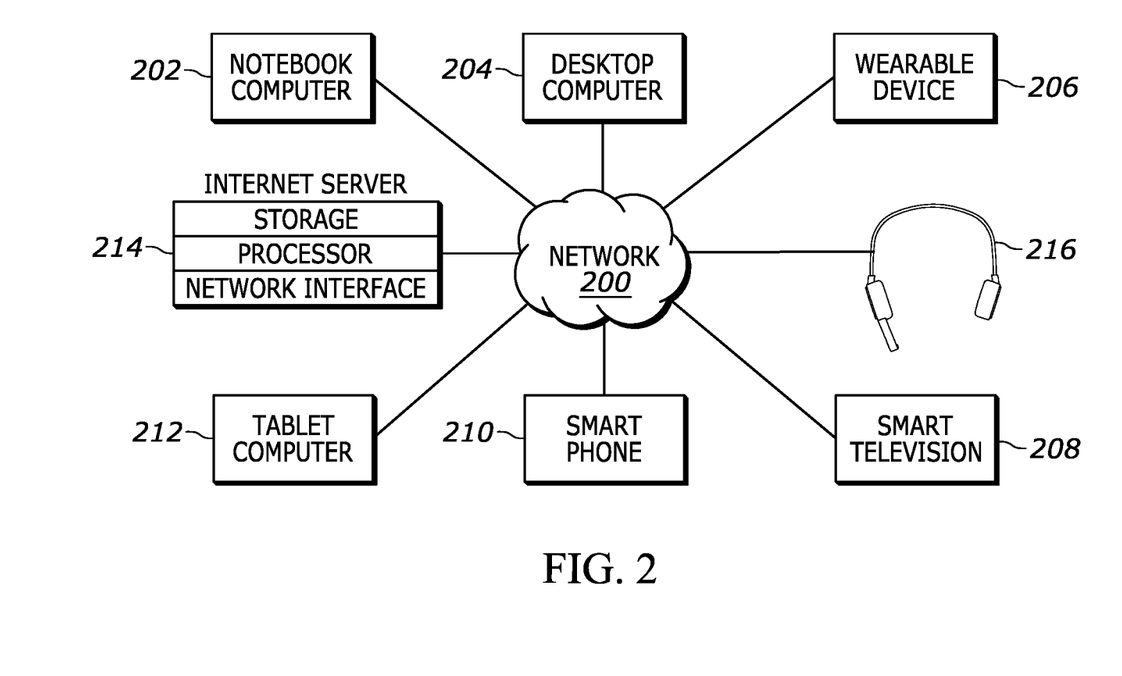
FIG. 2 is a block diagram of an example network of devices consistent with present principles.

Turning now to FIG. 2, example devices are shown communicating over a network 200 such as the Internet or a Bluetooth network in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212, 216. It is to be understood that the devices 202-216 may be configured to communicate with each other over the network 200 to undertake present principles.

Figure 3:
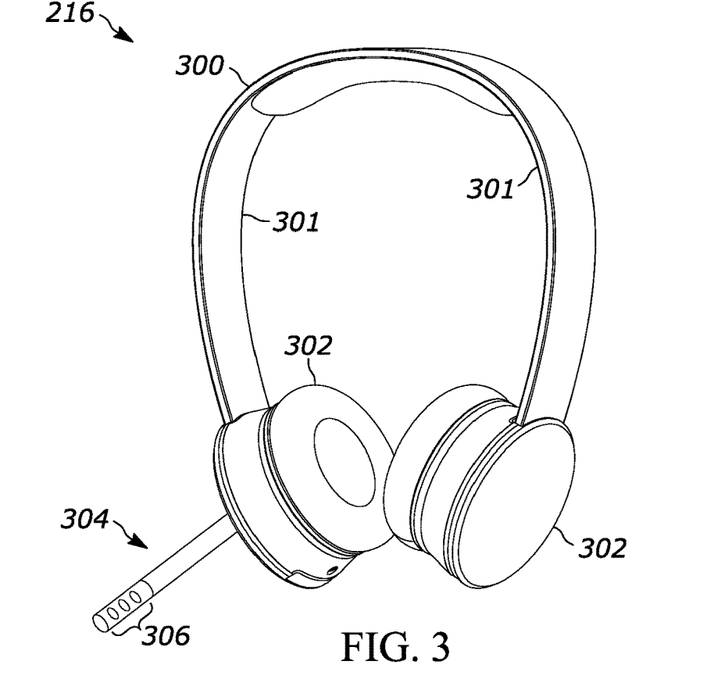
FIG. 3 shows a perspective view of an example headset consistent with present principles.

FIG. 3 shows a perspective view of the headset 216 in more detail. As shown, the headset 216 may include a headband 300 at least in part establishing a housing for the headset 216. The headband 300 may be configured to engage a person's head to hold the headset 216 on the person's head and may include arms 301 that extend down and connect to respective ear cups 302 that may be disposed over the person's ears to hear audio produced by speakers in the respective cups. Though not shown for simplicity, the headset 216 may also include other components such as a battery for powering the headset 216 and a Bluetooth transceiver or other communication interface for communicating with another device consistent with present principles.

Figure 4:
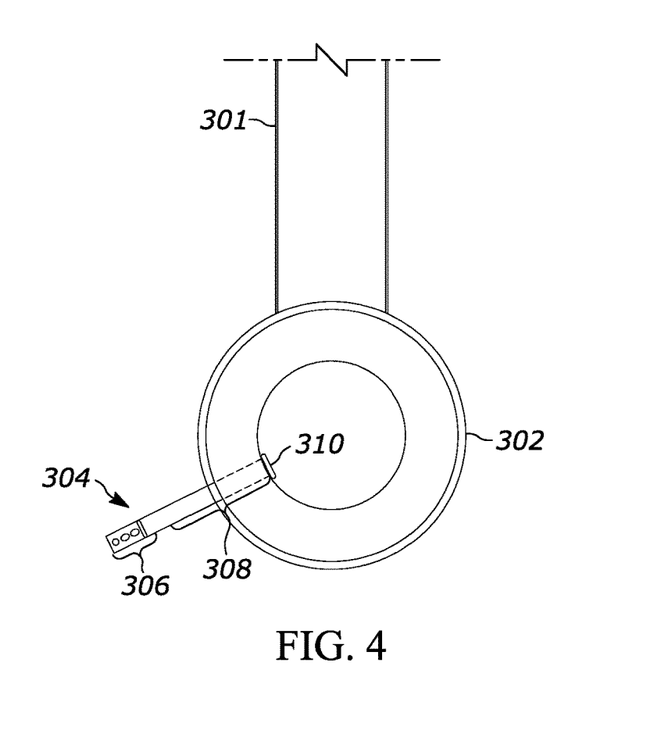
FIG. 4 shows a side elevational view of a lower part of the headset that includes a boom consistent with present principles.

FIG. 3 also shows that a boom 304 may extend laterally away from the headset 216 while the headset 216 is worn so that a distal end segment 306 of the boom 304 is positioned in front of the person's mouth. FIG. 4 shows a side elevational view that further illustrates. As shown, the boom may be connected at a proximal end segment 308 to an outer portion of one of the ear cups 302 or another portion of the housing of the headset. The connection may be established by a hinge 310, for example, that permits angular movement in a horizontal plane or oblique plane relative to ground when the headset 216 is worn so that the boom 304 can be adjusted for positioning in front of the mouth of different people with different head shapes and sizes. The hinge 310 may be a living hinge or a pin hinge, for example.

Figure 5:
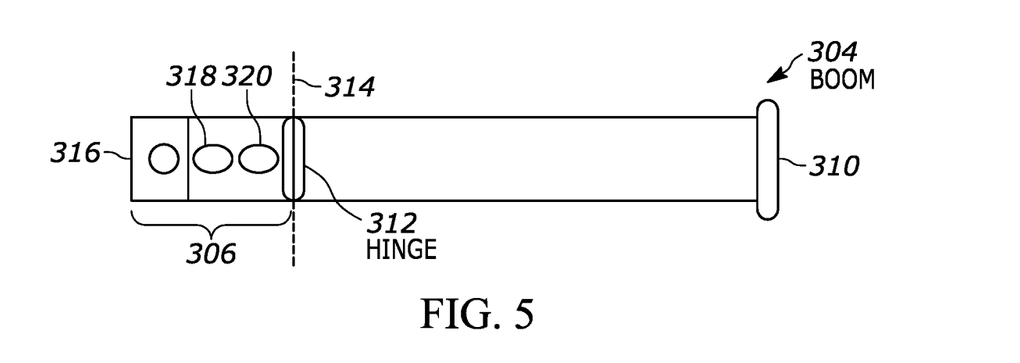
FIG. 5 shows an elevational view of an inner side of an example boom of a headset consistent with present principles.

FIG. 5 illustrates even further. This figure shows an elevational view of an inner side of the boom 304, i.e. the side that would face the person's mouth when the headset 216 is worn. Part of the hinge 310 is shown, but note that a second hinge 312 may also be included on the boom 304 that permits inward rotation of the distal end segment 306 toward the person's mouth about a hinge axis 314 that may be vertical or oblique relative to vertical. The hinge 314 may also be a living hinge or pin hinge, for example.

As also shown in FIG. 5, the distal end segment 306 of the boom 304 may include various sensors such as a microphone or microphone array 316. The segment 306 may also include one or more infrared (IR) light sensors 318 pointed toward the user's mouth and configured to sense IR light such as IR light that may be emitted from an IR light lamp or illuminator 320. The sensor(s) 318 themselves may be high or low resolution IR cameras and/or IR photo diodes. The sensor(s) 318 may be used by the headset 216 or another device in communication with the headset to execute time of flight algorithms to identify shapes and three-dimensional features of various portions of the person's mouth based on light emitted by the lamp(s) 320 that reflects off the person's mouth and back to the sensor(s) 318. Input from the sensor(s) 318 may then be used to generate a three dimensional (3D) point cloud of the user's mouth or a 3D image of the person's mouth so that mouth feature extraction may then be executed consistent with present principles.

Figure 6:
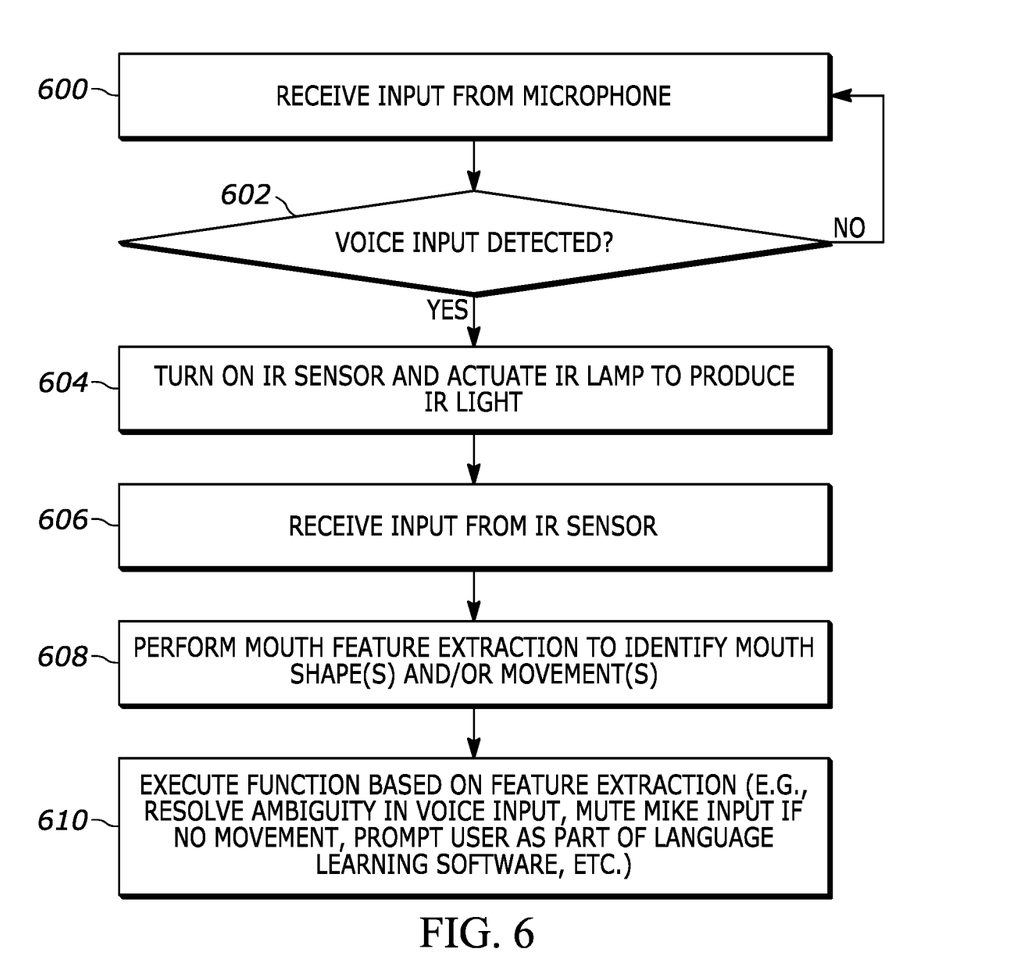
FIG. 6 is a flow chart of an example algorithm executable consistent with present principles.

Before moving on to FIG. 6, note with respect to FIGS. 3-5 that while the headset 216 is shown as an ear cup headset, other types of headsets may also bear a boom similar to the boom 304 for use consistent with present principles. For example, an earpiece headset may be used where the headset wraps around a single ear and has a boom that extends toward and in front of the person's mouth. Augmented reality (AR) and virtual reality (VR) headsets may also bear booms as described herein and may be used consistent with present principles. Computerized smart glasses with booms might also be used.

Now referring to FIG. 6, it shows example logic that may be executed consistent with present principles by a device such as the system 100, the headset 216, and/or another device in communication with the headset 216 such as a laptop computer or smart phone. In some examples, a headset assembly may be established by a headset like the headset 216 as well as another device paired with the headset such as smart phone (e.g. via Bluetooth pairing) to give the other device control over the headset in a master/slave relationship. Thus, it is to be understood that various steps of the logic of FIG. 6 may be executed by either one of the devices that establishes the assembly, as might be specified by a system administrator or developer. However, also note that the headset assembly may be established by a single headset in some examples where, e.g., the headset is a smart headset with its own processor, storage, and other system components described above in reference to FIG. 1.

In any case, the logic may begin at block 600 where the device may receive input from a microphone on a boom of a headset. The logic may then proceed to decision diamond 602 where the device may execute voice to text software, voice recognition, and/or a digital assistant to determine whether the input from the microphone indicates voice input of a user speaking words (e.g., as opposed to indicating white noise, background noise or even other sounds the user's mouth might make that do not constitute intelligible words, such as the user chewing on potato chips).

A negative determination at diamond 602 may cause the logic to revert back to block 600 and proceed therefrom. However, an affirmative determination at diamond 602 may instead cause the logic to proceed to block 604. At block 604 the device may, in response to the affirmative determination, turn on the IR sensor on the headset's boom and actuate or control the IR lamp on the boom to produce IR light. The logic may then proceed to block 606, but before describing that block note that in some examples the device might not execute steps 600 and 602 and instead might simply control the IR lamp to produce IR light that can be sensed by the IR sensor while the headset is powered on and regardless of whether voice input of the user speaking is detected.

At block 606 the device may receive input from the IR sensor based on IR light from the IR lamp that is sensed by the IR sensor. The logic may then proceed to block 608 where the logic may execute a feature extraction algorithm to identify the user's mouth shapes and/or mouth movements based on the input from the IR sensor, such as identifying lip and tongue shape and movements. As examples, feature extraction may include edge detection, corner detection, blob detection, ridge detection, and scale-invariant feature transform. Then, also at block 608, the device may execute object recognition using the result(s) of the feature extraction in order to identify various parts of the user's mouth if object recognition is not itself included as part of the feature extraction algorithm that is used.

From block 608 the logic may then proceed to block 610. At block 610 the device may execute one or more functions based on the mouth feature extraction. For example, if voice recognition were used to recognize spoken words from the voice input received at block 600 but the voice recognition resulted in an ambiguity in identifying one or more of the spoken words (e.g., a word was spoken by the user that could correspond to multiple candidate words and the recognition result could not be resolved to a threshold level of confidence), then the device may use the mouth feature extraction and the input from the boom IR sensor to resolve the ambiguity. To do so, the device may compare lip and tongue positions while the user spoke the word(s) to one or more prestored templates of lip and tongue positions for the respective candidate words to determine which of the templates most closely matches the actual lip and tongue position of the user identified from the mouth feature extraction (e.g., as determined using an artificial intelligence or machine learning model having one or more artificial neural networks configured for doing so). Thus, the ambiguity may be resolved by selecting the associated candidate word for the template that most closely matches the user's tongue and lip positions as indicated via the mouth feature extraction. Also note that in some examples, resolving the ambiguity may occur using assistance from a remotely-located server that might have greater processing power than, e.g., the headset being used.

Another example of a function that may be executed at block 610 may be muting input to the microphone from being provided to other devices as part of a conference call if no mouth movement is detected based on input from the boom IR sensor (or at least no mouth movement corresponding to the user actually speaking intelligible words). As another example, the logic of FIG. 6 might be executed in conjunction with language learning software that instructs the user on how to speak a new language, and so the function may be to prompt the user to change the positioning of the user's tongue and/or lips while speaking a particular word if the user mispronounced the word as part of the learning experience (e.g., as detected based on input from the IR boom sensor and possibly also based on boom microphone input indicating the user mispronouncing the word).

Figure 7:
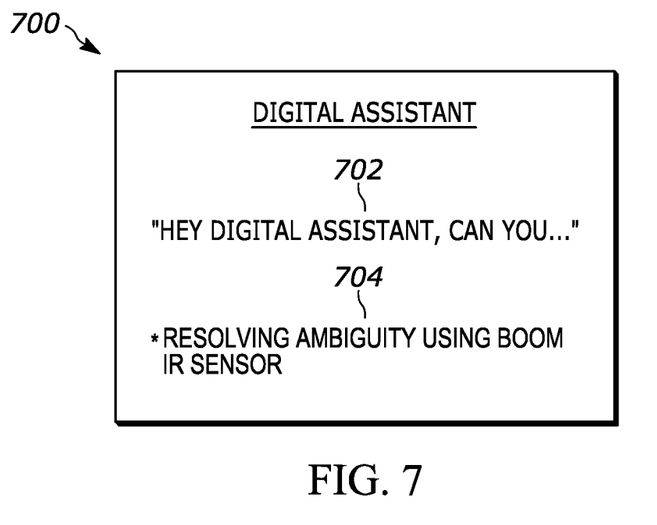
FIG. 7 shows an example graphical user interface (GUI) demonstrating infrared (IR) lamps and sensors on a headset boom being used to resolve an ambiguity in voice input to a digital assistant consistent with present principles.

The example function of resolving an ambiguity in one or more spoken words is further illustrated in FIG. 7. As shown, a graphical user interface (GUI) 700 may be presented on an electronic display accessible to a headset assembly consistent with present principles. For example, the GUI 700 may be presented on the display of a laptop computer that is paired with a Bluetooth headset having boom IR sensors as described herein. Also, assume the laptop computer is executing a digital assistant to process a voice command from the user that is provided via input to a boom microphone, and that the voice command includes an ambiguous word. The digital assistant itself may be, for example, Appel's Siri, Google's Assistant, or Amazon's Alexa.

Accordingly, as shown in FIG. 7 the GUI 700 may show words 702 of the command that have already been recognized to a threshold level of confidence, such as "Hey digital assistant, can you". Whatever word or words might have followed the foregoing as part of the command may be the words that the digital assistant could not affirmatively identify, resulting in an ambiguity that may be resolved as set forth above. While the ambiguity is being resolved, the example GUI 700 may present a text indication 704 that headset assembly is resolving the ambiguity using an IR sensor(s) on the boom of the headset. Once the ambiguity has been resolved, the device may then present the text for the rest of the command on the GUI 700 and execute the command itself (e.g., sending a text message or email, adjusting operation of an Internet of things device such as turning down the temperature on a smart oven, etc.).

Figure 8:
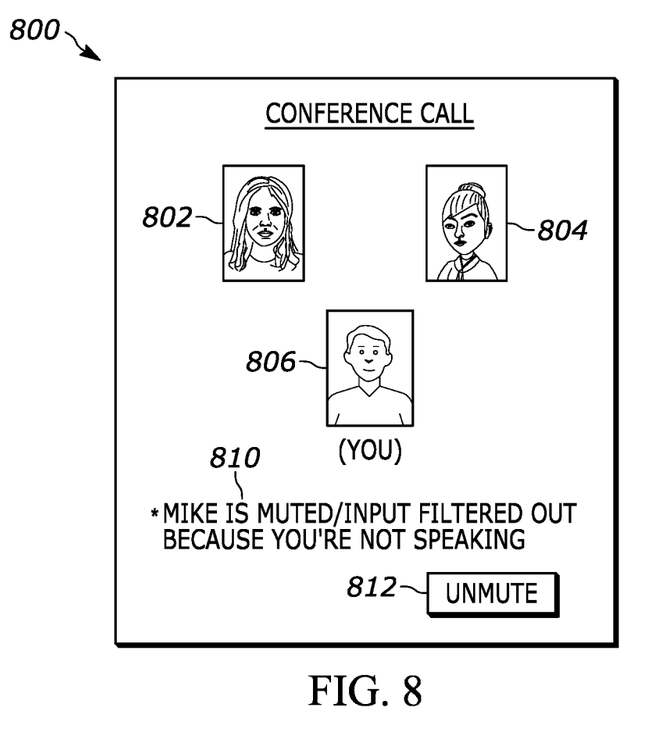
FIG. 8 shows an example GUI demonstrating IR lamps and sensors on a headset boom being used during a video conference call consistent with present principles.

FIG. 8 shows another example in which an IR sensor(s) on a boom of a headset may be used. In this case, the function being executed is facilitating a video conference with users of other devices. Thus, as part of the video conference an example GUI 800 may be presented on an electronic display accessible to a headset assembly that is being used for a local user to participate in the video conference. As shown in FIG. 8, respective real-time video feeds 802, 804 of the other conference participants may be presented during the call along with a video feed 806 of the user himself or herself.

Also during the conference call, the headset assembly may use its IR lamp and IR sensor on the boom of the headset to monitor the user's mouth/mouth movements. In some examples, the headset assembly may do so at all times during the conference call responsive to the conference call being initiated. However, in other examples the headset assembly may only turn on the IR lamp and/or IR sensor after the call has been initiated and responsive to the microphone on the boom of the headset detecting sound (or even detecting spoken words from the local user specifically).

Regardless, during the conference call, if the headset assembly does not detect mouth movement based on input from the IR sensor (e.g., the user stops speaking) then the assembly may dynamically mute input from the boom microphone so that no audio detected by the microphone is streamed to the other conference participants to prevent undesirable noise injection into the active conference call. The microphone audio may then be unmuted responsive to input from the IR sensor indicating mouth movement.

Additionally or alternatively, if the headset assembly does detect mouth movement based on input from the IR sensor on the boom but the user is still not identified as speaking words (e.g., as determined based on voice recognition using input from the boom microphone), then the assembly may not mute the boom microphone but may still filter out audio sensed by the boom microphone from being streamed to the other conference participants until the user is identified as speaking words. For example, input from the IR sensor may indicate mouth movement and the microphone may pick up the sound of the user eating potato chips or whistling, which may be filtered out from the audio being provided to the other conference participants. Then when the user is identified as speaking words, the audio of the user speaking words may be unfiltered and hence streamed to the other participants even if the audio filtering is still being used to concurrently filter out still other audio from the boom microphone (e.g., ambient noise, white noise, background noise, etc.). Additionally, if sound like a dog barking is detected but, based on input from a boom-mounted IR sensor, the user is not identified as moving his or her mouth, then the dog barking may be filtered out. Note that any suitable audio filtering algorithm or dynamic noise filter may be used to perform the audio filtering.

Still in reference to FIG. 8, while the dynamic muting or filtering is performed, the GUI 800 may indicate as much. For example, an indication 810 may be presented that includes text indicating that the boom microphone is muted and/or that input from the microphone is being filtered. The indication 810 may even give a reason for the muting or filtering. In this example, the microphone is being muted and the reason listed is that the user is not currently speaking. However, also note that a selector 812 may be presented for the user to select based on cursor or touch input in order to unmute the microphone anyway. If filtering were performed instead of muting, a different selector might be presented that may be selectable to stop audio filtering and to provide all audio detected by the boom microphone.

Figure 9:
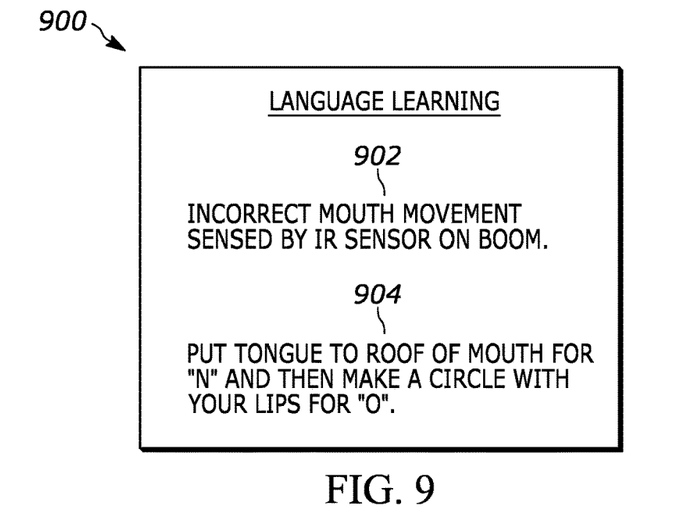
FIG. 9 shows an example GUI demonstrating IR lamps and sensors on a headset boom being used with language learning software consistent with present principles.

Now describing FIG. 9, yet another example is shown in which an IR sensor(s) on a boom of a headset may be used. In this example, the function being executed is executing language learning software that instructs a user on how to speak a new language. Accordingly, FIG. 9 shows an example GUI 900 that may be presented on an electronic display accessible to a headset assembly for English language learning.

Consistent with present principles and as reflected in FIG. 9, the user may be prompted via the GUI 900 to change the positioning of the user's tongue and/or lips while speaking a particular word in the English language if the user mispronounced the word as part of the learning experience (e.g., as detected based on input from the IR boom sensor and possibly also based on boom microphone input indicating the user mispronouncing the word). In this example, the word being spoken is "no".

In some implementations, the GUI 900 may be presented responsive to the user incorrectly pronouncing the word "no" and thus the prompt may include a text indication 902 that the user's mouth movement was incorrect while pronouncing the word "no" (again as may be detected based on input from the IR sensor on a headset boom as described herein along with execution of facial feature extraction using the IR sensor input). The GUI 900 may also include text instructions 904 prompting the user to place the user's tongue at a particular location within the user's mouth and then to make a particular shape with the user's lips to pronounce the word "no".

Figure 10:
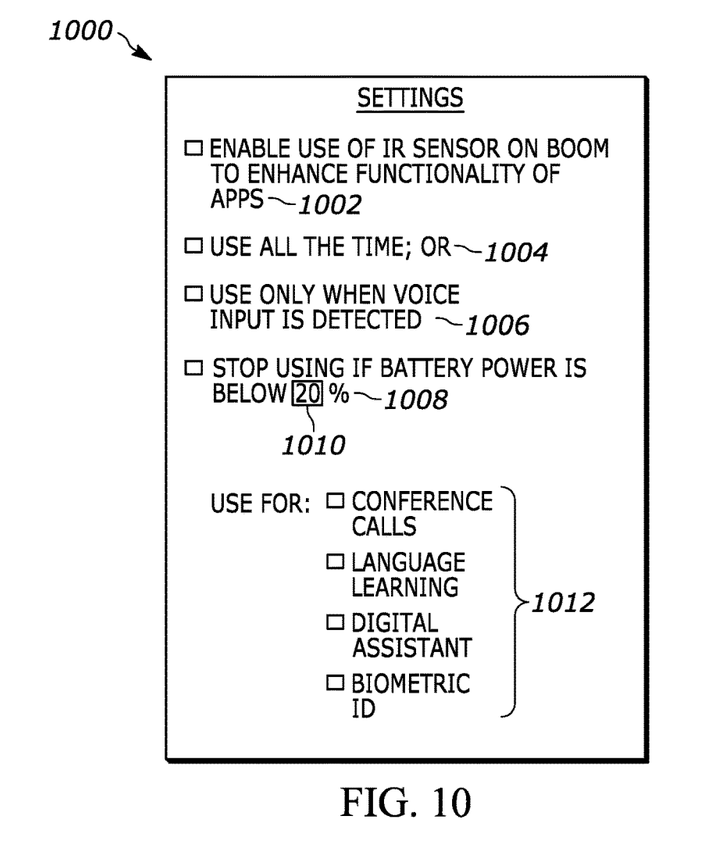
FIG. 10 shows an example GUI that may be presented on a display for configuring one or more settings of an assembly operating consistent with present principles.

Continuing the detailed description in reference to FIG. 10, it shows an example GUI 1000 that may be presented on an electronic display accessible to a headset assembly consistent with present principles. The GUI 1000 may be used for configuring one or more settings of the assembly/headset. It is to be understood that each of the options to be discussed below may be selected by an end-user directing touch or cursor input to the corresponding check box adjacent to the respective option.

Beginning first with the option 1002, it may be selected to set or enable the assembly to, in the future, use IR lamps and/or sensors on a headset boom to execute functions consistent with present principles. For example, the option 1002 may be selected to set or configure the assembly to undertake the logic of FIG. 6 and execute the operations described above in reference to FIGS. 7-9.

The GUI 1000 may also provide the user with a choice to use IR lamps and sensors on a headset boom all the time while the headset is worn and powered on (option 1004) or only when voice input is detected by a microphone on the boom (option 1006). The GUI 1000 may further include an option 1008 that may be selected to set or enable the assembly to stop using the IR lamps and sensors on a headset boom to perform mouth feature extraction and execution of a function as described herein when battery power for the headset reaches a predetermined low battery charge threshold so that the assembly can preserve headset power. The end-user may even direct numerical input to input box 1010 to establish the threshold as a percentage of battery power remaining.

As also shown in FIG. 10, the GUI 1000 may include respectively selectable options 1012 to select various particular functions or software applications for which the assembly should use IR lamps and sensors on a headset boom to perform mouth feature extraction to assist in or execute a function consistent with present principles. For example, in terms of functions the IR lamps and sensors on a headset boom may be used for conference calls, for language learning, for helping a digital assistant resolve ambiguities in voice input, and also for biometric identification.

Regarding biometric identification, note that the user's mouth structure (including tongue dimensions and lip contours) may be used as a way to biometrically identify a user as part of authentication (e.g., to log in to a device, to log in to a website, receive physical access to a secure facility, etc.). Additionally or alternatively, note that the speed at which a user speaks predetermined words (e.g., the user's first and last name), mouth gestures, and even the particular way the user might say or one or more words (e.g., shape and gestures of the lips) might also be sensed using a boom-mounted IR sensor and used for authentication alone or in combination with other forms of authentication.

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A headset assembly, comprising:
   a headset housing;
   at least one processor;
   a microphone boom coupled to the headset housing, the microphone boom comprising an infrared (IR) sensor on a distal end segment, the IR sensor accessible to the at least one processor, the microphone boom further comprising at least one microphone accessible to the at least one processor; and
   storage accessible to the at least one processor and comprising instructions executable by the at least one processor to:
   turn on the IR sensor responsive to voice input detected via the at least one microphone receive input from the IR sensor;
   based on the input from the IR sensor, perform mouth feature extraction; and
   based on the mouth feature extraction, execute at least one function.

2. The headset assembly of claim 1, wherein the headset assembly comprises a headset and another device in communication with the headset, the other device comprising the storage and an interface for receiving the input from the IR sensor to, at the other device, perform the mouth feature extraction and the execution of the at least one function.

3. The headset assembly of claim 1, wherein the headset assembly comprises a headset, the headset comprising the at least one processor and the storage, the headset performing the mouth feature extraction based on the at least one processor executing at least part of the instructions at the headset.

4. The headset assembly of claim 1, comprising an IR lamp on the distal end segment, wherein the instructions are executable to:
   actuate the IR lamp to produce IR light that is sensed by the IR sensor for the mouth feature extraction.

5. The headset assembly of claim 1, wherein the mouth feature extraction comprises identifying a shape of a user's mouth.

6. The headset assembly of claim 1, wherein the instructions are executable to:
   based on the mouth feature extraction, resolve an ambiguity in voice input received via the at least one microphone to enhance accuracy of a digital assistant in executing a command indicated in the voice input.

7. The headset assembly of claim 1, wherein the instructions are executable to:
   mute input from the at least one microphone based on the mouth feature extraction indicating no mouth movement.

8. The headset assembly of claim 1, wherein the instructions are executable to:
   based on the mouth feature extraction, determine that a user's mouth is moving but that the user is not speaking; and
   based on the determination, filter out audio indicated in input from the at least one microphone from being provided to a second device different from the headset assembly.

9. The headset assembly of claim 1, wherein the IR sensor comprises an IR camera.

10. The headset assembly of claim 1, wherein the instructions are executable to:
    perform the mouth feature extraction to authenticate a user via biometric identification.

11. A method, comprising:
    turning on one or more infrared (IR) sensors on a headset responsive to voice input detected via at least one microphone; and
    based on turning on the one or more IR sensors responsive to voice input detected via the at least one microphone, executing mouth feature extraction using input from the one or more IR sensors.

12. The method of claim 11, comprising:
    executing the mouth feature extraction to subsequently mute the at least one microphone.

13. The method of claim 11, comprising:
    executing the mouth feature extraction to authenticate a user to log in to a device.

14. The method of claim 11, comprising:
    executing the mouth feature extraction using the input from the IR sensor to enhance accuracy of a digital assistant in executing a voice command.

15. A headset assembly, comprising:
    a headset housing;
    at least one processor coupled to the headset housing;
    an infrared (IR) sensor coupled to the headset housing;
    at least one microphone coupled to the headset housing; and
    storage accessible to the at least one processor and comprising instructions executable by the at least one processor to:

turn on the IR sensor responsive to voice input detected via the at least one microphone; and based on turning on the IR sensor responsive to voice input detected via the at least one microphone, execute mouth feature extraction using input from the IR sensor.

16. The headset assembly of claim 15, wherein the instructions are executable to:

based on the mouth feature extraction, enhance accuracy of a digital assistant in executing a voice command.

17. The headset assembly of claim 15, wherein the instructions are executable to:

mute additional input from the at least one microphone based on the mouth feature extraction indicating no mouth movement.

18. The assembly of claim 15, wherein the instructions are executable to:

execute the mouth feature extraction to authenticate a user.

19. The assembly of claim 18, wherein the instructions are executable to:

execute the mouth feature extraction to authenticate the user to log in to a device.

20. The assembly of claim 19, comprising the device.

\* \* \* \* \*